(12) United States Patent  (10) Patent No.: US 7,063,379 B2
Steuer et al.  (45) Date of Patent: Jun. 20, 2006

(54) ROOF MODULE FOR VEHICLES

(75) Inventors: Peter Steuer, Karlsruhe (DE); Siegfried Reichmann, Rheinau Freistett (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/491,741

(22) PCT Filed: Sep. 17, 2002

(86) PCT No.: PCT/DE02/03484

§ 371 (c)(1),
(2), (4) Date: Sep. 2, 2004

(87) PCT Pub. No.: WO03/031232

PCT Pub. Date: Apr. 17, 2003

(65) Prior Publication Data

US 2005/0017546 A1    Jan. 27, 2005

(30) Foreign Application Priority Data

Oct. 5, 2001 (DE) ................. 101 49 137

(51) Int. Cl.
*B60J 7/57* (2006.01)
(52) U.S. Cl. .................................... 296/223
(58) Field of Classification Search ................ 296/223
See application file for complete search history.

(56) References Cited

U.S. PATENT DOCUMENTS

| 4,818,010 | A |  | 4/1989 | Dillon |
| 4,867,498 | A |  | 9/1989 | Delphia et al. |
| 5,040,990 | A |  | 8/1991 | Suman et al. |
| 5,154,617 | A |  | 10/1992 | Suman et al. |
| 5,208,483 | A | * | 5/1993 | Reneau ............. 307/10.1 |
| 5,650,929 | A |  | 7/1997 | Suman et al. |
| 5,825,096 | A |  | 10/1998 | Morimoto et al. |
| 2002/0158491 | A1 | * | 10/2002 | Patelczyk et al. ..... 296/220.01 |

FOREIGN PATENT DOCUMENTS

| DE | 196 53 431 | 7/1997 |
| DE | 196 47 203 | 5/1998 |
| DE | 199 58 605 | 6/2001 |

* cited by examiner

*Primary Examiner*—Dennis H. Pedder
(74) *Attorney, Agent, or Firm*—Kenyon & Kenyon LLP

(57) ABSTRACT

A roof module for accommodation in a hollow space of a roof area of a vehicle. Both manually operable, movable areas and movable areas operable by an actuating drive may be integrated into the roof area. The roof module may be assigned to a drive of movable area or to frame elements in which the movable area is guided. In the roof module, electronic components and sensors are accommodated, which form functional groups for operating the movable roof area, for monitoring and air conditioning the vehicle's passenger compartment, for communications with external information systems and for activating vehicle security systems.

15 Claims, 3 Drawing Sheets

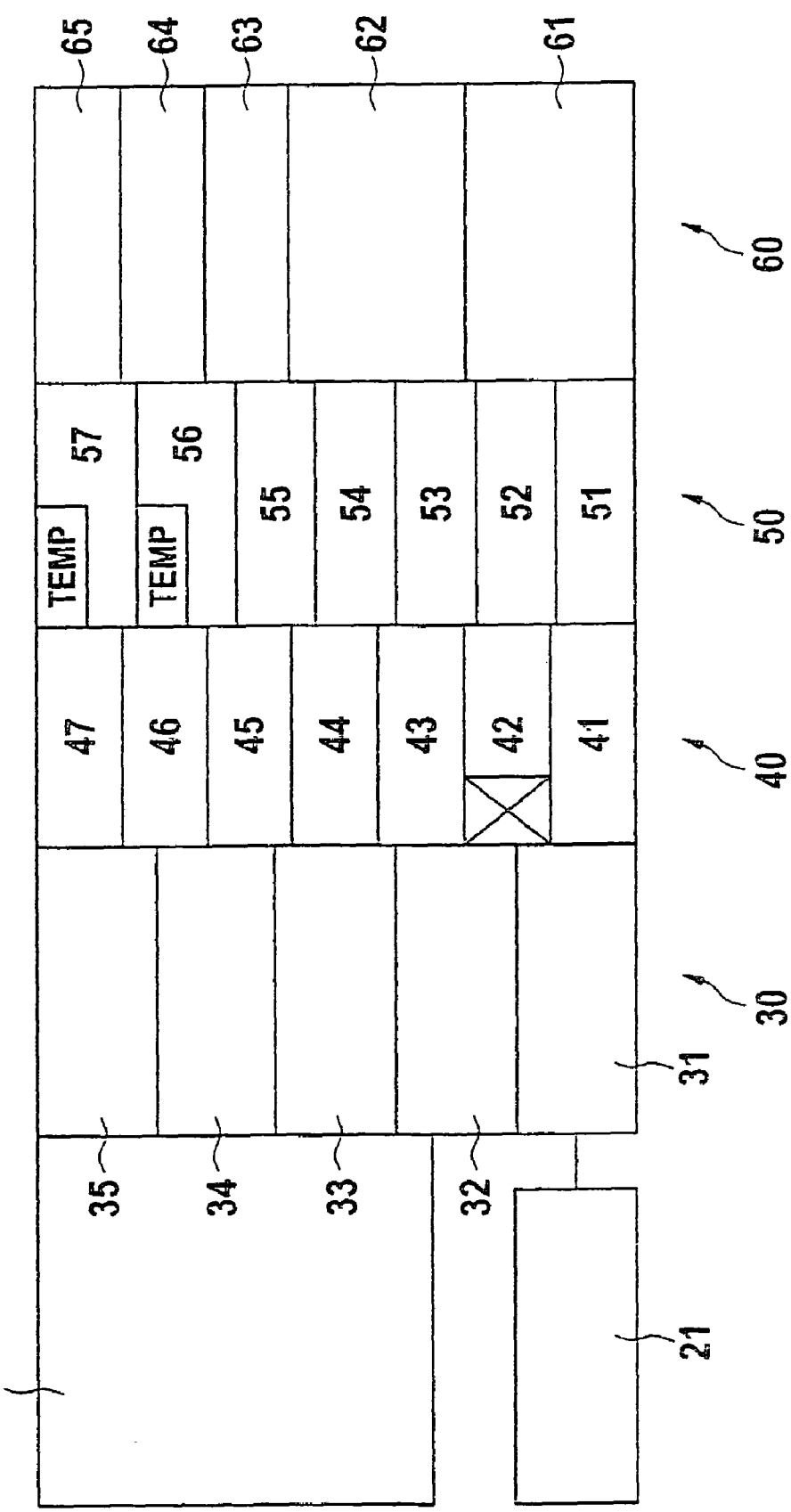

ROOF MODULE FOR VEHICLES

FIELD OF THE INVENTION

The present invention relates to a roof module for vehicles.

BACKGROUND INFORMATION

Today's vehicles, especially today's manufactured motor vehicles, may be outfitted with remote-controlled locking systems, clocks synchronized with a reference clock, navigation systems as well as antennas for radio reception. The systems mentioned may be accommodated in the vehicle in decentralized fashion, and in each case they represent a separate interface for information exchange within certain transmitter/receiver systems. The increasingly strict conditions upon the operation of mobile phones while driving require solutions that limit to a minimum the distraction of attentiveness of the driver to traffic happenings.

In the headliner (roofliner) structure of motor vehicles, these days, reading lamps assigned to passenger seats, sun shades, diverse places where one may keep garage door openers, sun glasses, etc, are accommodated, as well as displays which make parking easier for the driver and indicate the distance to obstacles that border on the parking space, optically and acoustically. In addition, in the headliner control panels are accommodated for operating lifting roofs/sliding roofs as well as temperature indicators which, for example, measure the outside temperature and display it to the driver.

Rain sensors are generally fastened to the windshield, and they automatically activate the windshield wiper drive, in response to the change of the refractive index of the windshield caused by rain drops and correspondingly recorded, without an intervention by the driver being required.

In the headliner of a motor vehicle, in addition, the receiving station of a central locking system may be accommodated, to which the driver directs an appropriate transmission element to terminate the locking condition of the vehicle doors, and after the transmission of a coded signal the locking of the vehicle doors is terminated.

SUMMARY OF THE INVENTION

With the exemplary embodiment and/or exemplary method of the present invention, a roof module for the motor vehicle field is provided, whose electronic components may be utilized for multiple functions, so that they are compactly installed. They should be very easy to install in mass production, and because of their compact nature the roof module may be accommodated in a space of the motor vehicle that is dry and not sensitive to impact, just like the hollow space between the outside of the roof and the headliner. The compact construction of the roof module may be caused by the fact that the built-in electronic components may be used for a plurality of functions, and consequently the number of components remains small.

The roof module forms a central interface, in which antennas for navigation systems and radio reception, as well as the function of passenger compartment monitoring, to name a few examples, are able to be integrated. The exemplary roof module of the present invention particularly allows for integrating a hands-free system, so that the driver may be distracted as little as possible in his concentration on traffic happenings. Besides the integration of the hands-free system, the exemplary roof module configured according to the present invention also has a platform for communicating with a mobile telephone. By dialing the roof module over a mobile telephone, the vehicle's owner is able to inform himself quickly as to the closed or open state of a sliding roof or a lifting/sliding roof, and take precaution against damage from approaching storms.

In another exemplary embodiment, several functional groups may be realized in the roof module, for each of the functions, on a partial basis, identical components being applicable, so that the number of electronics components to be integrated in the roof module remains small. To prevent excessive heating up, such as in the case of strong sunshine, the roof module may be outfitted with a cooling element, via which the developing heat may be carried off or dissipated.

A functional group, for example, may be realized in the roof module in that the roof module includes a control panel for operating a roof area cutout that is movable using an actuating mechanism, a display output for indicating data for the driver as well as, for example, a Hall sensor for determining the rotational position of the actuating mechanism of the movable area or for its rotational speed recording for ascertaining the position of the roof area section along its sliding path in the roof surface of the motor vehicle.

An additional functional group within the roof module may be represented, for example, by the interface to outside communications systems, and include an antenna or differently designed receiving devices for a navigation system for radio reception, as well as an interface for dialing the roof module via a mobile telephone, as well as a clock that may be set via radio. In this functional group there may also be integrated into the roof module a hands-free system, a microphone unit as well as a transmission part for the hands-free system. In addition, it is conceivable to integrate into this functional group an automatic inside mirror dimmer.

In a third functional group representable in the exemplary roof module of the present invention, definitive functions for the convenience and monitoring of the passenger compartment of the motor vehicle may be integrated, such as, for instance, for the activation of the inside lighting, a sensor for switching on the light, sensor components which, depending on the outside temperature and the sunlight operate sunshades. With the aid of a seat occupation sensor that is also integrated into the roof module, one may detect where inside the passenger compartment of the motor vehicle the occupants have sat down, from which the weight distribution in the motor vehicle may be derived. The weight distribution inside the motor vehicle is of importance especially for the triggering of systems for increasing passive safety, such as air bags and seat belt tensioners, to name two, for example.

The third functional group may also include temperature sensors for the display of outside temperatures and for the air conditioning system of the vehicle, and also a motion detector to record, perhaps, the movements of children in the back seats, and to detect whether, during maneuvering, there are people present in the danger zone of the maneuvering vehicle.

Finally, a fourth functioning group may be provided in the exemplary roof module of the present invention, which includes a theft protection device, with which, after locking the vehicle, an acoustical or optical alarm annunciator is able to be activated. A rain sensor may also be provided, which records a change in the index of refraction of a sliding roof made of glass when it begins to rain, and appropriately activates the windshield wipers during travel, without the requirement of a manual intervention by the vehicle's driver. In this functional group, a fan activation may also be integrated, and solar cells may supply the drive to be assigned to the fan activation, which may be integrated either directly into the roof module or into the roof surface. Finally, inside this functional group, the function open garage door and remote radio operation may be integrated, and in addition, central locking for activating all door lock mechanisms from the outside after leaving the vehicle, in order to protect it from theft.

BRIEF DESCRIPTION OF THE DRAWINGS

FIG. 3 shows a series of functionalities of a roof module which are able to be integrated into the roof area of a motor vehicle.

DETAILED DESCRIPTION

Figure 1:
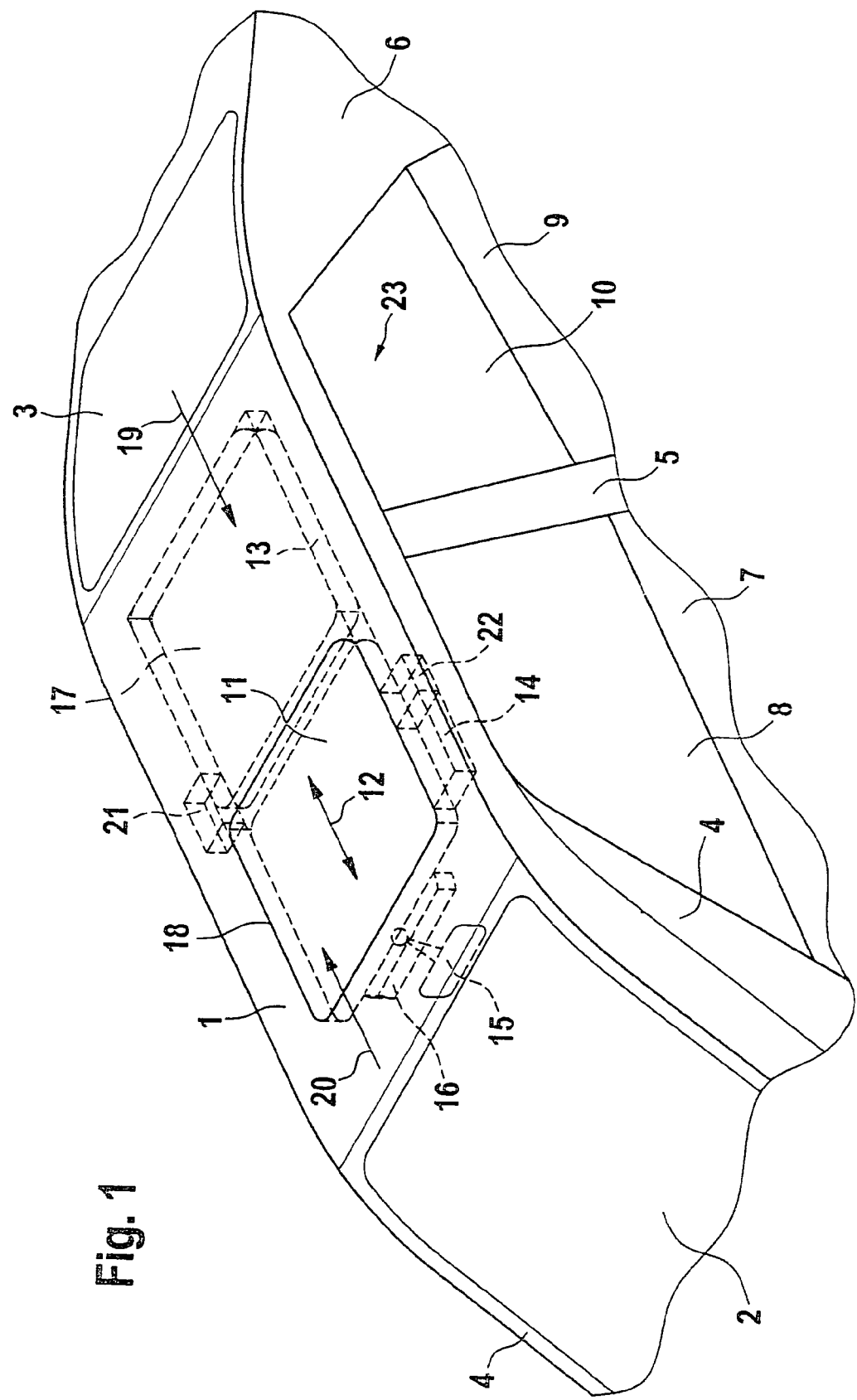
FIG. 1 shows the representation of a roof area of a motor vehicle, which borders on the passenger compartment of the motor vehicle.

FIG. 1 shows the representation of a roof area which borders on the passenger cell of the motor vehicle, and into which a roof module using a plurality of functional groups is integrated at the appropriate place.

In accordance with the representation reproduced in FIG. 1, a passenger compartment 23 of a vehicle, especially of a motor vehicle, is bordered by a roof area 1, a windshield 2 and a rear windshield 3. The limits that are lateral here, of passenger compartment 23 of the vehicle are given by window panes 8 contained in front doors 7 and window panes 10 in rear doors 9, that are movable up and down. Roof area 1 rests essentially on two windshield pillars 4, two center pillars 5 and in the rear region of the vehicle, on two rear pillars 6.

Into roof area 1 of the vehicle, in the representation according to FIG. 1, a movable sliding roof area 11 has been inserted, which is shiftable in the directions of the double arrow designated by reference numeral 12. The shifting movement of movable roof area 11 may be impressed on it either via a manually operated crank situated in the headliner, or via an actuating drive 21 that drives roof area 11. The movable area 11 of a sliding roof, as shown in FIG. 1, can only be movable in the horizontal direction in the directions of double arrow 12; in addition, in roof area 1, combined lifting roofs and sliding roofs may also be provided, whose area 11 may be raised from roof area 1 at a flat angle of pitch, and thereby enables a slit-shaped opening to form for ventilating passenger compartment 23 of the vehicle.

Movable area 11 is able to be inserted manually or with the aid of actuating drive 21 into a hollow space 17 in roof area 1, movable area 11 running in frame elements 13, which have been put into roof area 1 along the shifting path of the movable area. In response to insertion movements of movable area 11 into hollow space 17 of roof area 1, a roof opening 18 is uncovered, which corresponds to an open position 19. In the representation according to FIG. 1, movable area 11, which is movable along double arrow 12 with the aid of actuating drive 21, is present in its closed position 20.

It may be seen from FIG. 1 that a roof module 14, which integrates a plurality of functional groups, extends above the region of the driver's seat, and it may have assigned to it a cooling element 22 for carrying off the heat of the electronic components accommodated in roof module 14. Roof module 14 may just as well be accommodated on the side of passenger compartment 23, in which actuating drive 21 of movable area 11 is accommodated. Roof module 14 may be accommodated both directly at actuating drive 21 and at frame elements 13, which run edgewise through roof area 1, and at whose sides pointing to roof opening 18 area 11, that is movable in the horizontal direction, is shiftable.

In the transitional region between roof opening 18 and windshield 2, which limits passenger compartment 23 at the front end, a display 16 is situated in the vehicle's headliner, from which the driver may pick up data which are generated in part by the functions integrated in roof module 14. Below display 16 in the headliner of roof area 1, there is also situated an adjustable, dimmable inside mirror 15. As is not shown in FIG. 1, in the region of rear window 3, an extendable roll-up sun shield may be provided that may be operated with the aid of its own drive, which is intended to counteract excessive heating of passenger compartment 23 in response to the strong incidence of sunshine.

Figure 2:
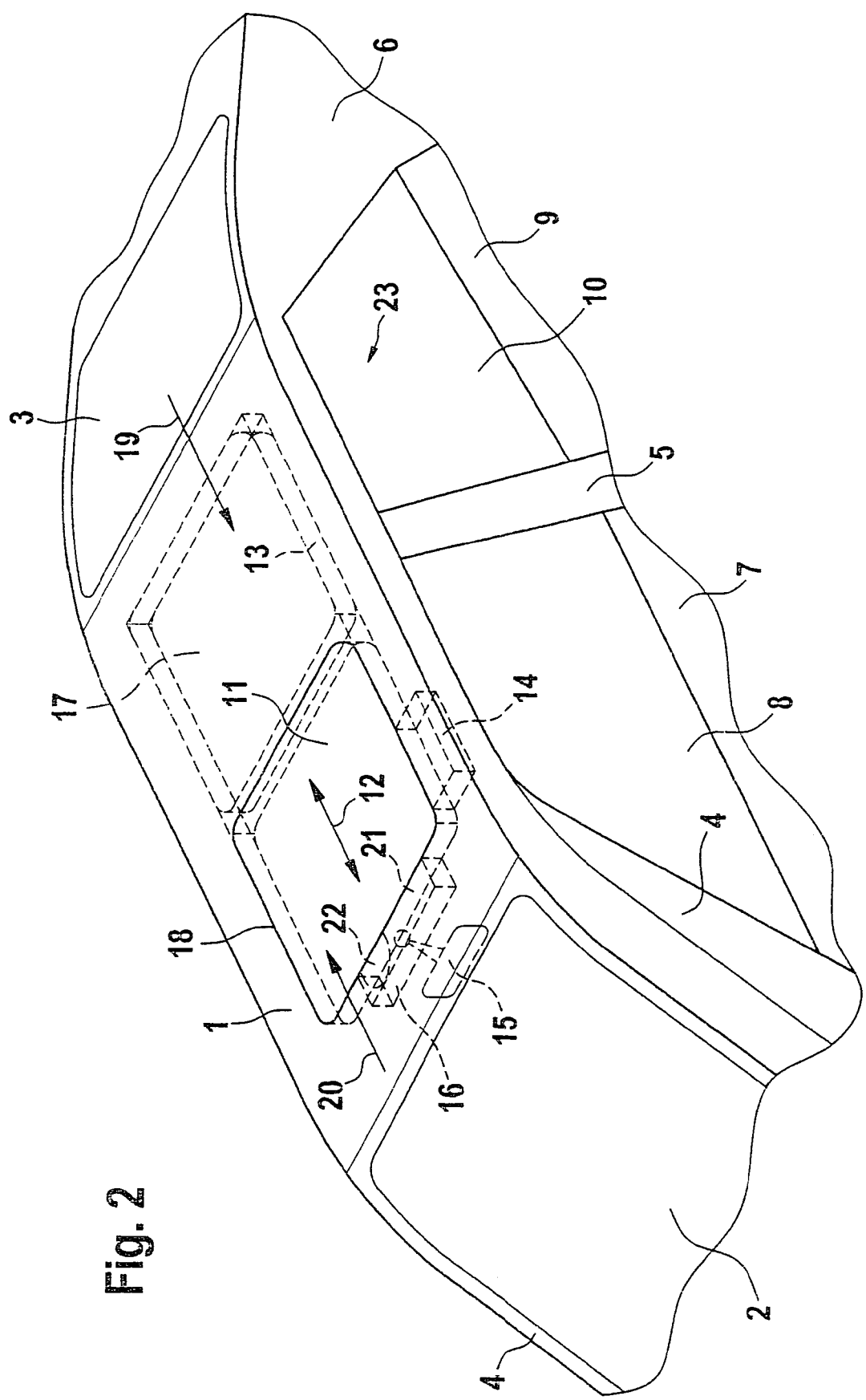
FIG. 2 shows the representation of a roof area according to FIG. 1 having an alternative position of the activating drive.

FIG. 2 shows an alternative specific embodiment of a roof area. According to this variant embodiment, actuating drive 21 and a cooling element 22 assigned to the actuating drive for carrying off the operating heat in the front roof region above a display 16 are situated in the headliner. In the illustration according to FIG. 2, display 16, that is located in the headliner, is covered by actuating drive 21 and cooling element 22 assigned to it, and is therefore not visible.

FIG. 2 shows a series of functionalities of a roof module, which are able to be integrated at a suitable location into the roof area of a motor vehicle.

To roof module 14, whose schematic structure and whose subdivision into several functional groups may be seen in FIG. 3, on the one hand, in the case of an electrically operable, movable area 11, drive 21 may be directly assigned, while a cooling element 22, assigned to the roof module, counteracts excessive heating of roof module 14 that is surrounded by a metallic housing. A cooling element 22 is required, depending on the place of installation of roof module 14 in a hollow space of roof area 1, but is not absolutely essential.

As may be seen from the illustration according to FIG. 3, the roof module includes several functional groups 30, 40, 50 and 60. The first functional group is designated by reference numeral 30, the second functional group by reference numeral 40, while the third functional group is identified by reference numeral 50 and the fourth functional group carries reference numeral 60.

Within first functional group 30 in roof module 14, operating functions 31, such as the complete opening, the complete closing of movable area 11 in roof area 1, as well as their partial opening are implemented; likewise, in operating function 31, the required function of a flat raising of movable area 11 from roof area 1 which extends essentially horizontally, required in the case of lifting/sliding roofs, may be initiated. Furthermore, within the first functional group, a fan control 32 is provided, using which a fan motor that ventilates passenger compartment 23 is able to be controlled. In addition, first functional group 30 includes an indicator 33, using which the position of a movable area 11, which is opened or closed with the aid of a mechanical cranking mechanism, is indicated. If roof area 1 is outfitted with an actuating drive 21, a Hall sensor is integrated within first functional group 30 so as to record its position in roof module 14. Using Hall sensor 34, both the current rotational position of actuating drive 21 and its speed during the operation of movable area 11 in the opening and closing direction may be recorded. Furthermore, first functional group 30 of multifunctional roof module 14 includes a display output 35, via which the individual data recorded by roof module 14, or transmitted to it via communications interfaces, may be made available to the driver, visually or acoustically, on display 16 in passenger compartment 23 of the vehicle.

Besides first functional group 30, a second functional group 40 is implemented in multifunctional roof module 14. Second functional group 40 includes several interfaces of roof module 14 to external information systems not shown here, but which enter into communications with roof module 14.

Position 41 denotes an inside mirror dimming control, via which, when there is a strong incidence of light from the rear end of the vehicle, an automatic dimming of inside mirror 15 at the front end of roof area 1 and allocated to the driver (for the driver's benefit) may be initiated. Inside of second functional group 40 there is further a microphone unit 42 integrated into multifunctional roof module 14, which functions as a part of a hands free system 43. When the mobile telephone number of the vehicle's driver is dialed, an output of the call can take place via a loudspeaker unit of hands free system 43, which the vehicle's driver is able to answer via microphone unit 42, e.g., a dismountable microphone, that is integrated into roof module 14.

Besides hands-free system 43 that contains a microphone unit 42, an interface 44 for a mobile telephone may also be provided in roof module 14. With the aid of interface 44, for example, if the vehicle has been parked with its movable sliding roof area open, and with rain beginning, a signal may be transmitted to the mobile telephone of the driver, whereby he is made aware of the open state of movable area 11 in roof area 1 of the vehicle. In order to record precipitation setting in, a rain sensor 62 is used that is implemented inside a fourth functional group 60 in roof module 14. Besides the detection of an open condition 19 of a movable area 11 in roof area 1 of a limousine, via a communications interface 44, the open condition of a convertible top of a convertible may also be detected, if, in the region of the latter's reinforced windshield 2, or at a rollover bar, a multifunctional roof module 14, configured according to the present invention, is integrated.

Second functional group 40 includes, in addition, receiving devices and transmitting devices 45, 46 with which signals from external information systems, such as a radio reception, may be received or a connection to navigation systems may be produced. In addition to that, second functional group 40 contains a receiving area 47 in multifunctional roof module 14, in the light of which a clock that is remote-controlled in the vehicle radio is adjustable to the respective local time.

In a further, third functional group 50 of multifunctional roof module 14, functions for air conditioning and for monitoring passenger compartment 23 of the vehicle are implemented.

The control of the passenger compartment lighting is designated by reference numeral 51, and it is activated, for instance, when one of vehicle doors 7 or 9 is opened. Furthermore, within functional group 50 of roof module 14 a sensor 52 may be accommodated, which assumes the switching on of the outside illumination as a function of the remaining daylight. A movement reporting function is denoted by reference numeral 53, via which both the movements of passengers, for example children accommodated on the back seat within passenger compartment 23 and the movements of persons, which may be staying in the danger region of a maneuvering motor vehicle, may be detected. Reference numeral 54 denotes a seat occupation sensor. With the aid of this sensor, it is ascertained where the passengers in passenger compartment 23 have sat down. In the light of the seat occupation by the passengers, a weight distribution of the vehicle mass may be undertaken, which may be supplied to central air bag control systems and other systems for increasing the passive safety of the passengers so as to determine suitable triggering thresholds. Besides that, third functional group 50 of multifunctional roof module 14 includes activation of internal lighting 55, such as reading lamps.

Coupled with sensor 52 for automatic switching on of lights, a sensor system 56 for protection from the sun may be accommodated within third functional group 50. While sensor 52 reacts to the influx of the remaining daylight, with the aid of sensor system 56 the temperature may be recorded, and when a certain temperature boundary value is exceeded, activation of roll-up sun shields, for instance, near the rear windshield or in the areas of window panes 10 of back doors 9 are triggered. Outer temperature recording is denoted by reference numeral 57, in the light of which, for instance, activation takes place of an air conditioning system and a fan for air conditioning passenger compartment 23 of the vehicle. For the purpose of saving on electronics components, the ascertainment of the incidence of daylight may be made via one of sensors 52 or 56, whereas the recording of the outside temperature may be performed via sensor 57 within third functional group 50 of multifunctional roof module 14.

Furthermore, in multifunctional roof module 14 according to the present invention, a fourth functional group is implemented, which is characterized by reference numeral 60. Within the fourth functional group, security functions, such as the initiation of a theft protection 61, may be shown, when the vehicle is left and locked. With the aid of theft protection 61, for example, when the vehicle is left and vehicle doors 7 and 9 are locked, activation may take place of a movement sensor 53 constituted as an all-around movement sensor, by which movements in passenger compartment 23 of the vehicle, as well as movements by persons that are present outside the vehicle may be detected. As a function of the signal intercepted by all-around movement sensor 53, an alarm system may be triggered via theft protection 61 of fourth functional group 60 in multifunctional roof module 14.

Besides theft protection 61, within fourth functioning group 60 in multifunctional roof module 14, rain sensor 62, that was already mentioned, is implemented. With the aid of rain sensor 62, one may determine changes appearing in the refractive index based on the incidence of precipitation on a glass surface. The change in the refractive index, detected by rain sensor 62, is transmitted to interface 44 for a mobile telephone within second functional group 40 of multifunctional roof module 14, so that the driver may have pointed out to him a moving area 11 of roof area 1 of his vehicle that is in an open position, when it begins to rain. The communications interface may also be used to transmit error functions to a mobile telephone carried by the driver, and to indicate these to the driver. Such error functions to be reported to the mobile telephone may be, for instance: automatic closing of the sliding roof/window lift control/ vehicle not locked.

In addition, within functional group 60 in multifunctional roof module 14, a remote operation radio 63 is implemented, as well as a garage door opener 64 emitting coded opening signals. In addition, fourth functional group 60 of roof module 14 may contain a control 65 for solar cells that are not shown here. The solar cells, which may be integrated in roof area 1, or which are located on the upper side of roof module 14, supply, for example, the fan motor that is controllable via control routine 32, with the required voltage. In addition, via the solar cells provided in roof area 1 of a motor vehicle, additional electrical components may be supplied with energy, so that the energy storage present in the motor vehicle may be unloaded when there is strong incidence of sunlight.

Schematically shown multifunctional roof module 14 in FIG. 3 (because of the supplying of the sketched adaptation capabilities within the various functional groups 30, 40, 50 and 60) is able to react rapidly to additional user requests, since the sensors and communications interfaces implemented in roof module 14 may be used for a plurality of functions, so that the number of electronics components present in roof module 14 may be limited. Depending on the application, functional groups 30, 40, 50 and 60 may also be composed according to additional points of view, and their number may also vary as a function of the implemented functions.

What is claimed is:

1. A roof module for a vehicle, comprising:
   electronic components; and
   sensors;
   wherein the electronic components and sensors are accommodated in the roof module, and represent functional groups for operating a movable area by an actuating drive, for monitoring and air conditioning a passenger compartment of the vehicle, for providing communications with an external telecommunication system and for activating a vehicle security system, and
   wherein the roof module is for accommodation in a hollow space in a roof area of the vehicle, the movable area being a manually operable, movable area or a movable area operable by the actuating drive which is integrated into the roof area of the vehicle, the roof module being accommodated at the actuating drive or at frame elements of the movable area, the functional groups include output channels for an information display in a passenger compartment of the vehicle, communication interfaces to information systems that are external to the vehicle, a reception part as an interface for a mobile telephone and transmission/reception devices adapted to provide data exchange for a navigation system.

2. The roof module of claim 1, wherein the roof module is surrounded by a housing made of a metallic material, and a cooling element is assigned to the roof module.

3. The roof module of claim 1, wherein the roof module is accommodated in a headliner of the roof area in a region of the driver seat, and wherein it includes a dismountable microphone unit as a part of a hands free system.

4. The roof module of claim 1, wherein a first functional group of the functional groups in the roof module includes an operating function of the movable area, a fan control, and a Hall sensor for recording a rotational speed of the actuating drive of the movable area.

5. The roof module of claim 1, wherein the second functional group in the roof module includes an activating mechanism for an inside mirror, a hands free system, and a vehicle clock controlled by a radio.

6. The roof module of claim 1, wherein a third functional group in the roof module includes at least some of the sensors to activate interior and exterior illumination of the vehicle, and at least some of the sensors to record an incidence of light, movements of people, and temperature.

7. The roof module of claim 6, wherein the third functional group in the roof module includes a seat occupation sensor, an all around monitoring sensor for the passenger compartment, and a sensor to record movements of at least one of a vehicle passenger and a person at the vehicle.

8. The roof module of claim 1, wherein a fourth functional group in the roof module includes a rain sensor, a receiving part of a central locking system, an activation function or arrangement of a theft protection function or arrangement, a garage door activating transmitter unit, and a control function or arrangement of solar cells for supplying electrical air conditioning components of the passenger compartment.

9. A method for operating a roof module of a motor vehicle, the method comprising:
   generating signals with functional groups of the roof module;
   processing the signals with an evaluation unit; and
   transmitting at least one of the signals and the processed signals, according to specifiable evaluation criteria, via a communications interface to an external telecommunications system;
   wherein the roof module includes:
      electronic components, and
      sensors,
         the electronic components and sensors forming functional groups, and including the integrated communications interface to the external telecommunications system,
         the electronic components and sensors being accommodated in the roof module, and representing the functional groups for operating a movable area by an actuating drive, for monitoring and air conditioning a passenger compartment of the vehicle, for providing communications with the external telecommunication system and for activating a vehicle security system, and
         the roof module is for accommodation in a hollow space in a roof area of the vehicle, the movable area being a manually operable, movable area or a movable area operable by the actuating drive which is integrated into the roof area of the vehicle, the roof module being accommodated at the actuating drive or at frame elements of the movable area, the functional groups include output channels for an information display in a passenger compartment of the vehicle, communication interfaces to information systems that are external to the vehicle, a reception part as an interface for a mobile telephone and transmission/reception devices adapted to provide data exchanae for a navigation system.

10. The method of claim 9, wherein, upon a rain signal of a rain sensor, and a signal of at least one open opening of the motor vehicle, a warning information is sent to an external mobile telephone via the communications interface.

11. The method of claim 9, wherein, in response to a closing or locking of a movable part on the motor vehicle, an error signal is generated if the part does not completely and correctly close, and warning information is sent to an external mobile telephone via the communications interface.

12. The method of claim 9, wherein, upon a signal for activating the theft warning device via the communications interface, warning information is sent to an external mobile telephone.

13. The method of claim 9, wherein at least one of data from the external telecommunications system is exchangeable with the roof module via the communications interface, and control commands for activating certain functions of the functional groups are transmittable.

14. The method of claim 9, wherein the at least one of the signals and the processed signals include warning information.

15. The method of claim 10, wherein the opening includes at least one of a sliding roof, a window and a convertible roof.

* * * * *